United States Patent [19]
Williams

[11] Patent Number: 5,674,023
[45] Date of Patent: Oct. 7, 1997

[54] FASTENER CLIP AND JOINT ASSEMBLY

[75] Inventor: David Ray Williams, Kokoko, Ind.

[73] Assignee: Delco Electronics Corporation

[21] Appl. No.: 563,247

[22] Filed: Nov. 27, 1995

[51] Int. Cl.$^6$ .................................................. F16B 9/02
[52] U.S. Cl. ................ 403/231; 174/40 CC; 174/158 R;
248/507; 248/508; 361/807; 361/825; 403/403;
403/405.1
[58] Field of Search ...................... 174/40 CC, 158 R;
238/323, 351, 355; 248/507, 508; 403/231,
240, 403, 405.1; 411/104, 169; 361/807,
808, 809, 825

[56] References Cited

U.S. PATENT DOCUMENTS

| | | | |
|---|---|---|---|
| 501,564 | 7/1893 | Goodyear | 403/403 |
| 726,070 | 4/1903 | Keen | 403/405.1 |
| 1,005,278 | 10/1911 | Morgan | 238/351 X |
| 1,051,451 | 1/1913 | Robertson | 238/351 X |
| 1,085,277 | 1/1914 | Lund | 292/194 |
| 1,617,017 | 2/1927 | Dudley | 24/569 X |
| 2,007,367 | 7/1935 | Dodds | 238/351 X |
| 2,136,366 | 11/1938 | Martin | 439/806 |
| 2,683,577 | 7/1954 | Flora | 403/240 X |
| 3,084,211 | 4/1963 | Rapata | 174/158 R |
| 3,155,771 | 11/1964 | Steger et al. | 248/507 X |
| 3,325,692 | 6/1967 | Manetti et al. | 248/507 X |
| 3,387,814 | 6/1968 | Fischer | 248/507 |
| 4,067,168 | 1/1978 | Thurner | 52/733 |
| 4,316,676 | 2/1982 | Turner | 403/206 |
| 4,545,103 | 10/1985 | Bryant | 29/432 |
| 4,549,831 | 10/1985 | Lautenschlager, Jr. | 403/403 X |
| 4,973,187 | 11/1990 | Sauder | 403/205 |
| 5,228,739 | 7/1993 | Love | 296/100 |
| 5,364,203 | 11/1994 | Ishikawa | 403/403 |
| 5,452,978 | 9/1995 | Winton, III | 403/403 X |

FOREIGN PATENT DOCUMENTS

| | | | |
|---|---|---|---|
| 194976 | 9/1986 | European Pat. Off. | 403/405.1 |
| 4-212218 | 8/1992 | Japan | 174/158 R |
| 87065 | 11/1920 | Switzerland | 361/807 |
| 967692 | 8/1964 | United Kingdom | 238/351 |

Primary Examiner—Anthony Knight
Assistant Examiner—Andrea Chop
Attorney, Agent, or Firm—Jimmy L. Funke

[57] ABSTRACT

A clip rigidly joins two parts, one part abutting the other. A first part has a hole spaced from the surface of the second part. The clip has two spaced plates connected by a spine. One plate has a hooked or notched tongue which engages the hole. The other plate seats on the second part and both plates have edges abutting the first part. Apertures in the plates accept a screw, rivet or other fastener which holds the clip to the second part and pulls the two parts together.

10 Claims, 2 Drawing Sheets 5,674,023

1

FASTENER CLIP AND JOINT ASSEMBLY

FIELD OF THE INVENTION

This invention relates to a system for fastening abutting parts and particularly to a clip for joining parts and a joint assembly employing such a clip.

BACKGROUND OF THE INVENTION

Abutting parts of various materials are joined by screws, glue, welding, rivets, wire and cables, clamps, tape and other means. Each of these have advantages and disadvantages depending on the application.

It is desired, however, to have a universal fastener system suitable for all materials and useful for joining abutting parts of various thicknesses and strengths. It is also desirable to have such a system which affords extremely strong joints yet is readily detachable for disassembly if desired.

SUMMARY OF THE INVENTION

It is therefore an object of the invention to join abutting parts with a simple joint which is both strong and easy to disassemble. It is another object to afford an inexpensive and relatively quick and inexpensive way to join such parts.

The invention is carried out by abutting a first part against a transverse second part, attaching a clip to the first part and coupling the clip to the second part by a standard fastener to securely attach the first part to the second part. The first part has a hole spaced from the second part and the clip attaches to the hole and extends to the surface of the second part. The clip, which may be metal or plastic fashioned by any desired method, has a head plate with a shoulder bearing against the first part adjacent the hole and a tongue with a hooked end which extends through the hole to hook onto the other side, a foot plate which rests on the surface of the second part and has an edge in contact with first part, a spine spaced from the first part and interconnecting the plates, and aligned apertures in the plates for receiving a fastener. The fastener is a standard elongated fastener such as a wood screw, metal screw or rivet and extends through the apertures to secure the clip to the second part. The fastener screws into the second part or extends through the second part to pull the clip and the first part against the second part. The clip, when drawn tight by the fastener, forms a rigid joint since the foot seats firmly against the second part and both plates have edges engaging the first part to brace the parts against relative movement.

The hole can be a vertical slot and the tongue of the clip, instead of a hooked end, may have a notch which fits in the slot. The tongue is inserted in the slot and the clip is rotated 90° to engage the notch with the sides of the slot such that the opposed edges of the notch will engage either side of the first part.

BRIEF DESCRIPTION OF THE DRAWINGS

The above and other advantages of the invention will become more apparent from the following description taken in conjunction with the accompanying drawings wherein like references refer to like parts and wherein.

2

Figure 4A:
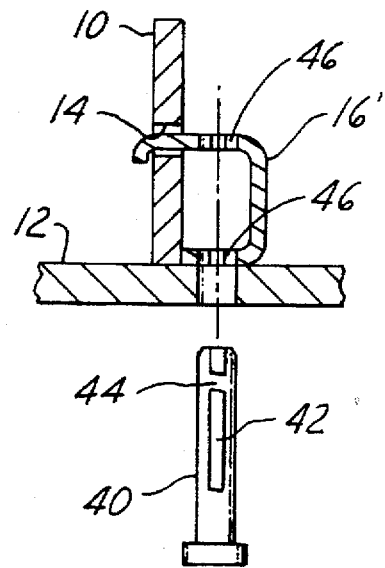
Figure 4B:
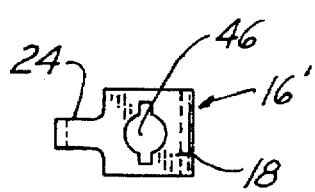
Figure 5:
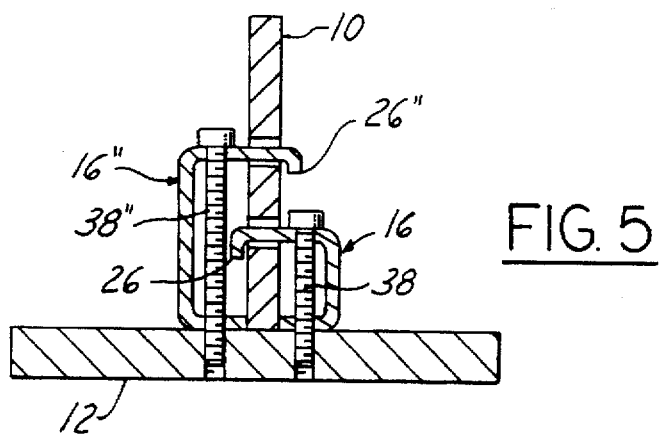
Figure 6:
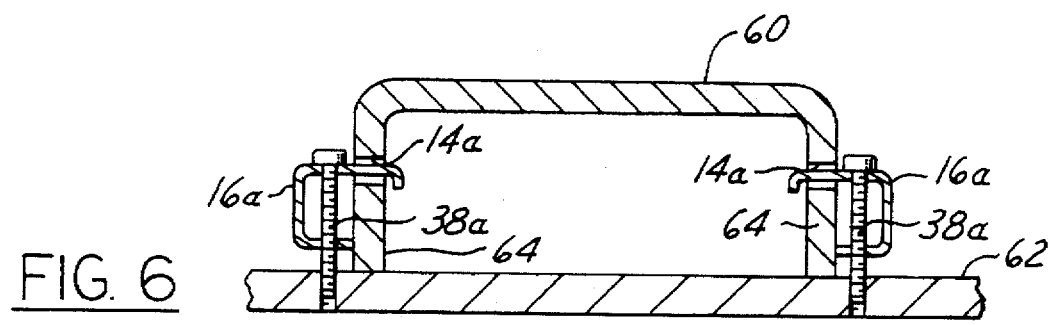
Figure 7:
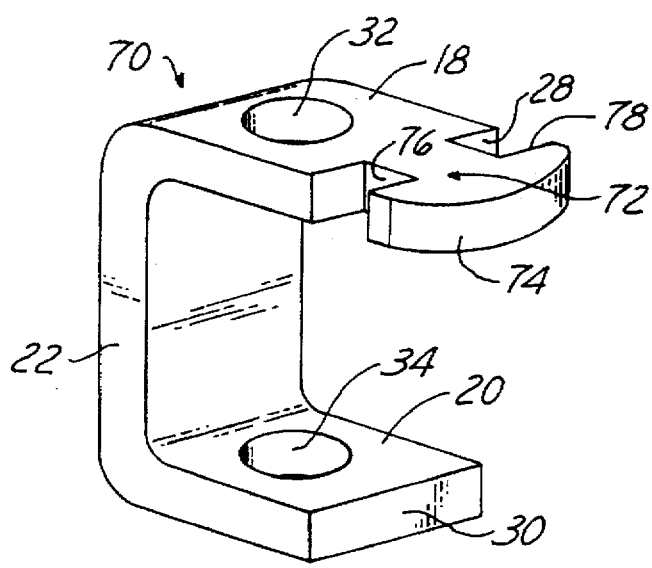
Figure 8:
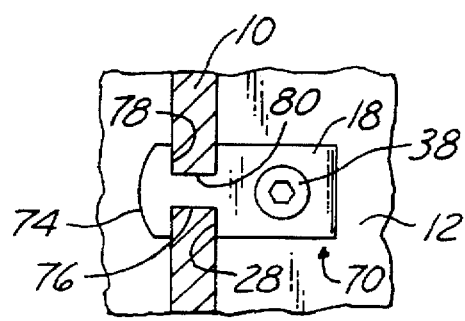

FIG. 4A is an exploded cross section of a joint assembly employing a hold down clip according to another embodiment of the invention;

FIG. 4B is a plan view of the clip of FIG. 4A;

FIG. 5 is a cross section of a joint assembly employing a pair of hold down clips according to the invention;

FIG. 6 is a cross section of another embodiment of a joint assembly employing a pair of hold down clips according to the invention;

FIG. 7 is an isometric view of another clip embodiment according to the invention; and FIG. 8 is a partly cross-sectioned view of a joint assembly including the clip of FIG. 7.

DESCRIPTION OF THE INVENTION

The parts being joined are comprised of various materials such a metal, wood and plastic. Similarly the hold-down clip used in the joint may be metal or plastic. While the ensuing description features metals which may be steel or aluminum, for example, it will be appreciated that other materials may be employed.

Figure 1:
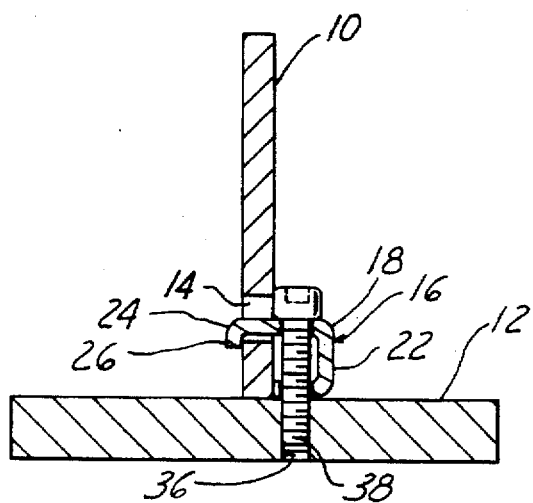
FIG. 1 is a cross section of a joint assembly employing a hold down clip according to the invention.
Figure 2:
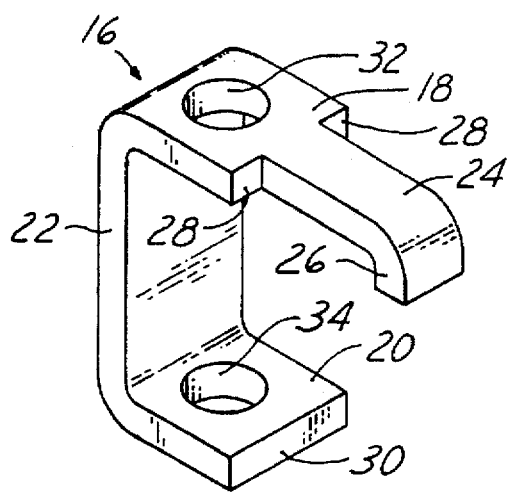
FIG. 2 is an isometric view of the clip of FIG. 1.

Referring to FIG. 1, a vertical plate 10 or first part abuts a horizontal base plate 12 or second part. A hole 14 in the plate 10 is spaced from the base plate 12 and is typically a drilled round hole but it may be rectangular, half-round or another shape formed by punching or other methods. A hold-down clip 16, best shown in FIG. 2, comprises a head plate 18 spaced from a foot plate 20 and connected by a spine 22. The spine is attached to one side of each plate. The head plate 18 has a tongue 24 extending from the center of a side opposite the spine 22 and terminates in a hook 26 which is bent down toward the foot plate. The tongue is narrower than the head plate so that a shoulder 28 is formed on the edge of the head plate on each side of the tongue. The tongue 24 extends through the hole 14 from one side of the vertical plate 10 and the hook 26 engages the other side of the vertical plate. The spine 22 is dimensioned such that with the hook in the hole and pulling down toward the base plate, the foot plate rests on the base plate. The edge 30 of the foot plate opposite the spine and the shoulders 28 of the head plate define a plane and are in contact with the vertical plate. The shoulders contact the vertical plate 10 alongside the hole 14.

To secure the clip to the base plate, the head plate and the foot plate have aligned apertures 32 and 34, respectively, with a common axis which is parallel to the plane defined by the shoulders and edge of the foot plate and is normal to the base plate. A tapped hole 36 in the base plate is aligned with the common axis. A metal screw 38 extends through the apertures 32 and 34 and is threaded into the tapped hole 36 to hold the foot plate 20 firmly against the base plate and to pull the vertical plate 10 tightly to the base plate via force exerted by the tongue 24. It is important that the clip have the correct height to tightly engage the hole 14 when the screw is tightened. However the clip material should be sufficiently resilient to permit some bending at the juncture of the spine 22 and the head plate 18 so that when the screw is tightened beyond that required to firmly seat the foot plate the tongue will be forced against the hole 14 to press the vertical plate against the base plate. Similarly, the tongue length must be suited to the plate 10 thickness so that the hook 26 will hold the clip shoulders 28 against the plate 10.

The clip 16 may have various sizes and heavy duty to light duty construction, or metal or plastic materials, as suited for robust or delicate applications. A medium duty metal clip, for example, is stamped from ⅛ inch sheet stock of cold rolled steel or stainless steel. The foot plate 20 is ½ inch on each side, and the head plate 18, excluding the tongue, is the same size. The tongue 24 is ¼ inch wide and long enough to span the vertical plate, say, ½ inch. The hook 26 turns down by ⅛ inch to grab the plate surface and hold the plate against the shoulders 28 and the edge 30 of the foot plate. The spine 22 is perhaps ½ to 1 inch long, according to the position of the hole 14 in the vertical plate. The apertures 32 and 34 are ¼ inch in diameter.

Figure 3:
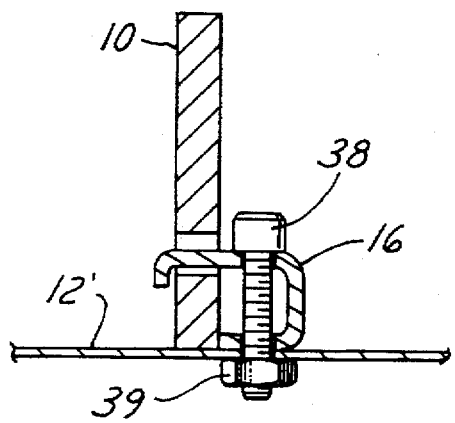
FIG. 3 is a cross section of a joint assembly employing a hold down clip according to the invention to secure a thick member to a thin one.

Instead of a tapped hole as shown in FIG. 1, a plain hole may be used and a nut can be threaded on the bottom end of the screw. This arrangement, as shown in FIG. 3, is particularly useful in joining a vertical plate 10 with a base 12' of thin material which would not support a tapped hole. Alternatively, the hole 32 in the head plate and possibly the hole 34 in the foot plate are tapped and the screw is inserted from below the base plate (or either thick or thin material) and threaded into the clip holes. If a self tapping screw is inserted from below, the hole 34 should be a plain hole with clearance for the screw and the hole 32 must be sized for the screw. As shown in FIG. 4A and 4B a quick disconnect fastener 40 having lateral ribs 42 with cam slots 44 can be joined to a clip 16' with special apertures 46 to receive the fastener 40. The fastener head engages the base plate 12. Another standard fastener which may be used is a rivet extending through the clip apertures and through the base plate.

Because the bottom of the foot plate 20 seats squarely on the base plate 12 and the edge 30 and the shoulders are in contact with the vertical plate, the clip assures that the vertical plate and the base plate are held perpendicular to one another and that the joint is strong and rigid. In many applications a single hold-down clip is satisfactory but in other cases more than one are used. They may be all on the same side of the vertical plate or some on each side. FIG. 5 shows a special case where two clips 16 and 16" are used on directly opposite sides of the vertical plate 10. The clip 16" is taller than the clip 16 to assure that the hook 26" does not impede access to the screw 38 in the clip 16. The screw 38" of clip 16" is positioned away from the vertical plate to assure clearance of the hook 26 on clip 16. This overlapping clip arrangement is useful where access to other portions of the joint is limited.

While it is preferred that the foot plate of the clip rest on the base plate, there are useful applications where it does not necessarily contact the base plate. If there is no such contact, the clip tends to pull the vertical plate (or first part) to the side away from its perpendicular relationship to the base plate. Where the first part is not a plate but is an object that is immune to being pulled over, the clip can be used to hold it to the base plate without itself touching the base plate. The advantage of this configuration is that the size of the clip and the location of the hole 14 are less critical. That is, if there is a space between the foot plate and the base plate, the size of the space is not important. FIG. 6 illustrates a part 60 which is U-shaped and mounted on a base 62 with two widely spaced walls 64 contacting the base. The part 60 is secured to the base using clips 16a on each of the two walls. Each of the clips 16a are like the clip 16 of FIGS. 1 and 2, but do not contact the base 62. This is easily accomplished even though the holes 14a in the walls may be improperly positioned for the ideal case, yet the mounting is secure because the part 60 will not be pulled out of position by the clips and screws.

A different version of the clip and joint assembly is shown in FIGS. 7 and 8. A clip 70 has a head plate 18 with a shoulder 28, a foot plate 20, a spine 22 and apertures 32 and 34 to receive a fastener like the clip of FIG. 2. The tongue 72 has a keyed portion which extends from the head plate 18 has an enlarged head 74, preferably of the same width as the head plate 18, and which defines a notch 76 of sufficient width to accommodate the thickness of the first part. The shoulder 28 forms one side of the notch and another shoulder 78 on the enlarged head 74 forms the other side of the notch. The vertical plate 10 has a slot 80 having its major axis perpendicular to the second part and which is vertically large enough to admit the head 74 when the clip is oriented 90° from its final position. The clip is assembled to the plate 10 by inserting the head 74 through the slot and then turning the clip 90° to seat the foot plate 20 on the base plate 12. The notch 76 thus embraces the vertical plate with the opposed shoulders 28 and 78 engaging opposite sides of the vertical plate 10. A fastener 38 extends through the holes 32 and 34 to secure the clip to the base plate 12. This keyed design is especially useful where the vertical plate is sheet metal and a rectangular slot is readily formed by punching or by a laser cut.

It will thus be seen that the joint assembly using the novel clip is easily and inexpensively constructed and affords strong joints. Where the clip is properly designed and the hole for receiving the tongue is correctly placed, the clip will seat on the base to assure that the part joined to the base will be a right angles to the base. In addition, the joints are easily disassembled and are thus especially useful for temporary structures requiring strong joints or those which are often taken apart to be moved and then reassembled. The clips may be made of metal or plastic by any desired process. In the case of plastic, a plastic molding would be a practical form of clip.

The embodiments of the invention in which an exclusive property or privilege is claimed are defined as follows:

1. A joint assembly comprising:
    a first part abutting a surface of a second part;
    an aperture in the first part spaced from the surface of the second part;
    a clip having
        a head plate having a tongue coupled to the aperture of the first part, a first clip aperture, and a shoulder in contact with the first part,
        a foot plate having a second clip aperture and an edge in contact with the first part,
        the first and second clip apertures being aligned on an axis substantially normal to the surface of the second part, and
        an integral spine parallel to the axis and connecting the head plate and the foot plate; and
    an elongated fastener extending through the first and second clip apertures and engaging the clip and the second part for pulling the clip toward the surface of the second part, whereby the tongue pulls the first part toward the second part.

2. The joint assembly as defined in claim 1 wherein the foot plate of the clip is positioned between the head plate and the surface of the second part.

3. The joint assembly as defined in claim 1 wherein the foot plate of the clip is positioned in contact with the surface of the second part.

4. The joint assembly as defined in claim 1 wherein the integral spine is dimensioned to position the foot plate of the clip in contact with the surface of the second part.

5. The joint assembly as defined in claim 1 wherein the fastener is a screw threaded into the second part and having a screw head engaging the clip head plate.

6. The joint assembly as defined in claim 1 wherein the fastener is a screw extending through the second part and threaded into a nut.

7. The joint assembly as defined in claim 1 wherein:
at least one of the clip apertures is formed to engage the fastener;
the second part is bounded by the surface and a second surface;
the fastener extends through the second part and has a head engaging the second surface; and
the fastener has a portion mating with the at least one of the clip apertures.

8. The joint assembly as defined in claim 1 wherein:
at least one of the clip apertures is formed to couple with a quick disconnect fastener;
the second part has a hole aligned with the first and second clip apertures; and
the fastener is a quick disconnect fastener which passes through the hole to engage the at least one of the clip apertures.

9. The joint assembly as defined in claim 1 wherein:
the aperture in the first part is a slot having its major axis perpendicular to the second part; and
the tongue has a notched key portion for engaging the slot, the key portion defining shoulders for engaging opposite surfaces of the first part.

10. The joint assembly as defined in claim 1 wherein:
the aperture in the first part is a slot having its major axis perpendicular to the second part; and
the head plate has a shoulder adjacent the tongue for abutting a surface of the first part; and
the tongue has an enlarged head defining another shoulder for abutting an opposite surface of the first part.

* * * * *